United States Patent [19]

Heath

[11] Patent Number: 4,554,559

[45] Date of Patent: Nov. 19, 1985

[54] THERMAL PRINT HEAD

[75] Inventor: John S. Heath, Winchester, England

[73] Assignee: International Business Machines Corporation, Armonk, N.Y.

[21] Appl. No.: 504,104

[22] Filed: Jun. 14, 1983

[30] Foreign Application Priority Data

Jun. 30, 1982 [GB] United Kingdom ............... 82303425

[51] Int. Cl.[4] .......................... G01D 15/10; B41J 3/02

[52] U.S. Cl. ................................ 346/76 PH; 400/120

[58] Field of Search .......................... 346/76 PH, 155; 219/216; 400/120; 197/1 R

[56] References Cited

U.S. PATENT DOCUMENTS

| | | | |
|---|---|---|---|
| 3,960,255 | 6/1976 | Bisson et al. | 197/1 R |
| 4,000,393 | 12/1976 | Cochran et al. | 219/216 |
| 4,427,988 | 1/1984 | de Kermadec et al. | 346/155 |

*Primary Examiner*—E. A. Goldberg
*Assistant Examiner*—Gerald E. Preston
*Attorney, Agent, or Firm*—Otto Schmid, Jr.

[57] ABSTRACT

A print head assembly with interchangeable pluggable printed circuit print heads has means for automatically positioning a head during insertion with the aim of ensuring registration of printed circuit electrodes on the head with correspondingly positioned conductors on a body portion. The print heads are supplied as a variety of types all of which are interchangeable as a simple push-fit in the body portion. A clamp ensures that ohmic contact is established and maintained between the registering electrodes and conductors. Each head is also provided with a pattern of electrodes which serve to identify the head type. The pattern bridges selected additional conductors on the body portion and provides a decodable pattern of signals in response to an interrogate signal unique to heads of that type. One of these electrodes on the head shorts a control conductor on the body portion to one or other of two adjacent guard conductors, if lateral misregistration of the head within the recess exceeds a predetermined amount.

7 Claims, 7 Drawing Figures

THERMAL PRINT HEAD

DESCRIPTION

BACKGROUND OF THE INVENTION

1. Field of the Invention

The invention relates to a print head assembly for non-impact printing and is applicable to any non-impact print head in which the print elements of the head and conductors for supplying signals to the elements are made by printed circuit techniques. Thus, although specifically relating to print heads designed for use with so-called resistive ribbons in order to print on plain paper, the invention is equally applicable to other heads such as, for example, thermal print heads designed to generate heat directly in order to print on heat sensitive paper, or even electro-erosion heads designed to print on electro-sensitive paper; provided that these heads are constructed using printed circuit techniques.

2. Description of the Prior Art

In each case, the print head is provided as a plurality of closely spaced electrodes extending across a supporting substrate and terminating in a line adjacent one edge of the substrate to define a line of print elements. In use, the print head is mounted adjacent a print receiving medium with the line of print elements disposed at right-angles to the intended print row direction. A print mechanism typically moves the print head across the medium in the row direction with circuits selectively energizing the individual electrodes to cause printing along the row in known manner.

As part of a development effort to produce a low cost in-contact printer with consistently high print quality, it has been found advantageous to construct the print head assembly so that a worn print head may be removed easily by an operator and replaced by a new one. One advantage which accrues from the decision to make the print heads interchangeable is that the importance of developing a long life head is reduced with a consequent reduction in cost. Simple replacement of a print head as necessary also makes servicing easier and cheaper.

Furthermore servicing by the customer himself becomes more practicable. It is essential for the commercial success of the printer that the method for removal and installation of the print heads is substantially foolproof and is simple and quick to perform.

SUMMARY OF THE INVENTION

A print head assembly according to the invention therefore comprises a body portion provided with a head recess into which interchangeable print heads may be plugged. Each print head consists of a plurality of printed circuit electrodes extending across the surface of an insulating substrate and terminating at one edge thereof in a closely spaced group defining a line of print elements of the required size and print density. A corresponding plurality of conductors carried by the body portion extend into the recess where they are available to make contact, one to one, with the electrodes on the head substrate. The construction of the body portion and the head are designed with the intention of bringing the electrodes on the head automatically into ohmic contact with the corresponding conductors within the recess upon insertion of the head into the recess.

Although the electrodes on the head substrate are generally fanned-out from the line of head elements to facilitate connection to the conductors within the body portion, they are in practice still extremely close together and there is a possibility that wear of a head substrate, for example, may lead to misregistration of the head electrodes and the conductors with consequent malfunction of the printer. A further feature of the invention therefore provides the means by which each head may be automatically checked on installation to determine whether or not any misalignment of the head within the recess lies within an acceptable tolerance range. This is achieved by providing an additional electrode on the head substrate dimensioned so that unacceptable sideways displacement of the head with respect to the conductors on the body portion causes a circuit to be completed between a further conductor and one or other of two guard conductors located one on each side of the conductor provided on the body portion.

In order to comply with data processing standards for high resolution printing and also to be able to select standard line pitches of 6, 8, 10 and 12 in the vertical direction a print density of 7.72 elements/mm (196 elements/inch) was selected as a standard print head for the assembly. International standards for facsimile transmission however, requires a print density of 3.85 elements/mm (97.79 elements/inch). Since the heads may be replaced at will, heads with different print densities from the selected standard may also be provided. Thus heads with print densities of 7.72 elements/mm for normal use and 3.85 elements/mm for facsimile transmission are provided as well as a variety of special heads designed for special printing operations. Heads with different electrode pitches and/or electrode widths may be required for example in order to print extra fine characters or to produce special graphic features such as extra thick lines. Although the print elements of each type of head are different, the disposition of the electrodes connected from the print elements and extending over the load substrate is identical at least over the part of the substrate that enters the recess in the body portion in order to contact the conductors on the body portion.

Since various head arrangements can be used, a further feature of the invention provides a means by which the control circuits of the printer controlling the print head can automatically sense which type of head is currently installed. This is achieved by providing a few additional conductors on the body portion and a variable pattern of bridging lands on the head substrate. An interrogate signal sent down one conductor to an installed head results in the receipt by other conductors on the body portion of a pattern of signals determined by the nature of the bridging lands. By this means, each head can be provided with a unique code by which logic circuits in the printer can identify which head is currently in place.

To save space on the print head substrate, the electrode on the print head to which, in use, a head interrogate signal is applied from a printer controller, also serves as the head registration electrode which, under adverse conditions, shorts the corresponding conductor on the body portion to one or other of its adjacent two guard conductors.

BRIEF DESCRIPTION OF THE DRAWINGS

In order that the invention may be full understood, preferred embodiments thereof will now be described with reference to the accompanying drawings. In the drawings.

DESCRIPTION OF THE PREFERRED EMBODIMENTS

Figure 2:
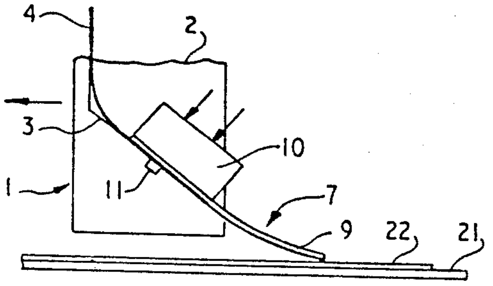
FIG. 2 shows the assembly of FIG. 1 in sectional view with the print head in place.

The various component parts of the print head assembly in its simplest form are shown in FIGS. 1 to 4. The perspective view of FIG. 1 and sectional view of FIG. 2 show a body portion 1 in the form of an open-sided receptacle 2 having a sloping internal surface 3 on which is supported one end of a flexible tape cable 4 carrying on its upper surface parallel conductors 5. The longitudinal position of the tape cable 4 within the receptacle 2 is determined by a projecting lug 6 which engages a correspondingly-shaped notch provided in one edge of the tape cable. A print head, shown removed from the body portion 1 in FIG. 1 and in place in FIG. 2, is also provided with an edge notch 8 which, together with the lug 6, determines the longitudinal position of the head within the receptacle. The head consists of an insulating substrate 9 on the underside of which are provided printed circuit print head electrodes etched from tungsten or stainless steel foil of the same pitch and spacing as the conductors 5 on the tape cable. The width of the head and tape cable are such that both just fit between the side walls of the receptacle and the lateral position of the electrodes on the print head is such that they mate one for one with the corresponding conductors on the tape cable. A clamp 10 retains the head in place in the body portion and an underlying resilient strip 11 in a transverse groove provides an upward force sandwiching the tape cable and print head together thus ensuring that ohmic contact is made between the mating electrodes and conductors.

Figure 1:
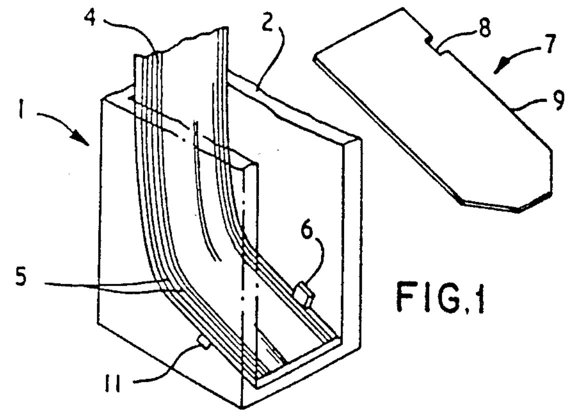
FIG. 1 shows one embodiment of a print head assembly according to the invention with the print head removed.
Figure 3:
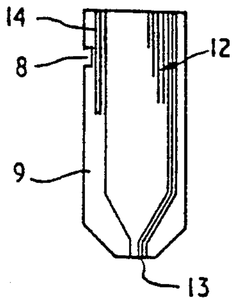
FIG. 3 shows a typical electrode layout on a print head.

With this assembly, it is an easy matter to replace heads as they become worn or to change head type to meet a particular job requirement. Although heads will differ from one type to another, in order for them to be interchangeable they all have the same basic construction. An electrode layout of a typical head is shown in FIG. 3 and a detail in FIG. 4. The parallel printed circuit electrodes indicated generally by reference 12 extending across the head substrate 9 converge towards each other at one end of the substrate to provide a closely-spaced group of electrodes defining a line of print elements 13 at the required print resolution.

Figure 4:
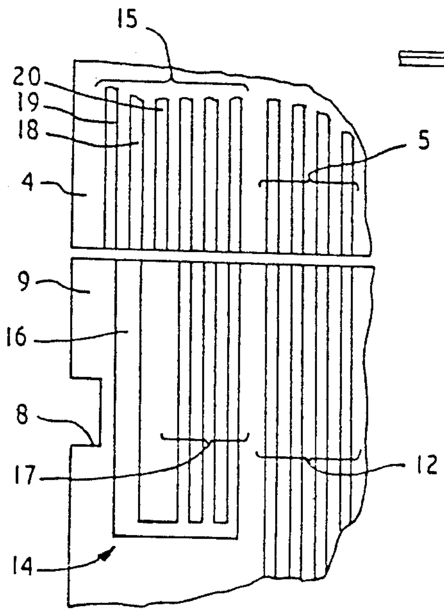
FIG. 4 shows a detail of the electrode layout of FIG. 3.

In addition to the head electrode, each head type is provided with a unique pattern of electrodes such as electrodes 14 shown in its simplest form in FIG. 3 and as a typical pattern in the detail of FIG. 4 which, together with additional conductors 15 on the tape cable, provide a means for checking lateral registration of the head with respect to the conductors 5 in the body portion; indicating to the printer controller whether or not a head is installed; and if so, what type of heat it is. The additional conductors 15 on the body portion are provided simply as additional tape cable conductors. The additional electrodes 14 on the print head are positioned so that they mate with selected ones of the correspondingly positioned conductors 15 on the tape cable when the head is installed.

Which conductors mate with which electrode of course depends upon the particular pattern of electrodes on the installed head. All heads are provided with a control electrode 16 to which the pattern of bridged electrodes such as electrodes 17 are connected. The electrode 16 is positioned to mate with a corresponding conductor 18 on the tape cable to which in operation head interrogate signals are supplied. Accordingly, prior to print initiation, the conductor 18 is energized with a head interrogate signal from the printer controller (not shown) and the resulting identifying pattern of signals returned to the conductors 15 via the control electrode 16 and bridging electrodes 17. Since the pattern of returned signals is unique for each head type, decode logic within the printer controller readily determines the type of head installed. Clearly no signal either indicates a gross malfunction of the unit or no head in place, either of which condition would be used to inhibit a printing operation.

The two conductors 19 and 20 on each side of the common conductor 18 are used as guard conductors to detect unacceptable lateral misregistration of a print head with respect to the conductors in the body portion. The amount of misregistration tolerated is determined by the relative spacing of the guard conductors and the width of electrode 16 on the print head. By making electrode 16 relatively wide as shown, only small displacements are possible without a short occurring between the common conductor 18 and one or other of the guard electrodes 19, 20.

In use therefore a print initiate cycle sends a head interrogate signal along conductor 18 to determine whether a head is installed and if so what type. No signals on guard conductors 19, 20 indicates that the head is laterally aligned within acceptable limits. Providing these checks are sastifactorily met, a subequal print cycle is permitted. The embodiment selected to illustrate the present invention uses the so-called resistive ribbon technology to perform printing operations. Thus in FIG. 2, a print head acutator (not shown) moves the head assembly across a print receiving medium 21 with the line of print elements 12 disposed at right-angles to the intended print row direction. A resistive ribbon 22 interposed between the print head and the medium 21 transfers ink to the medium in response to selective energization of the electrodes of the print elements in known manner.

Figure 6:
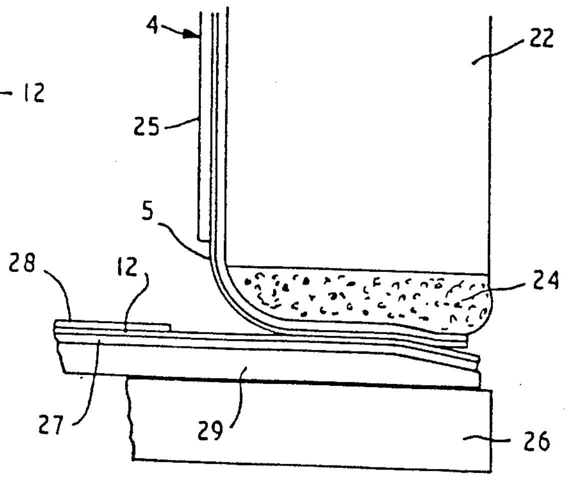
FIG. 6 shows a sectional view of the print head assembly of FIG. 5 with a print head in place.
Figure 5:
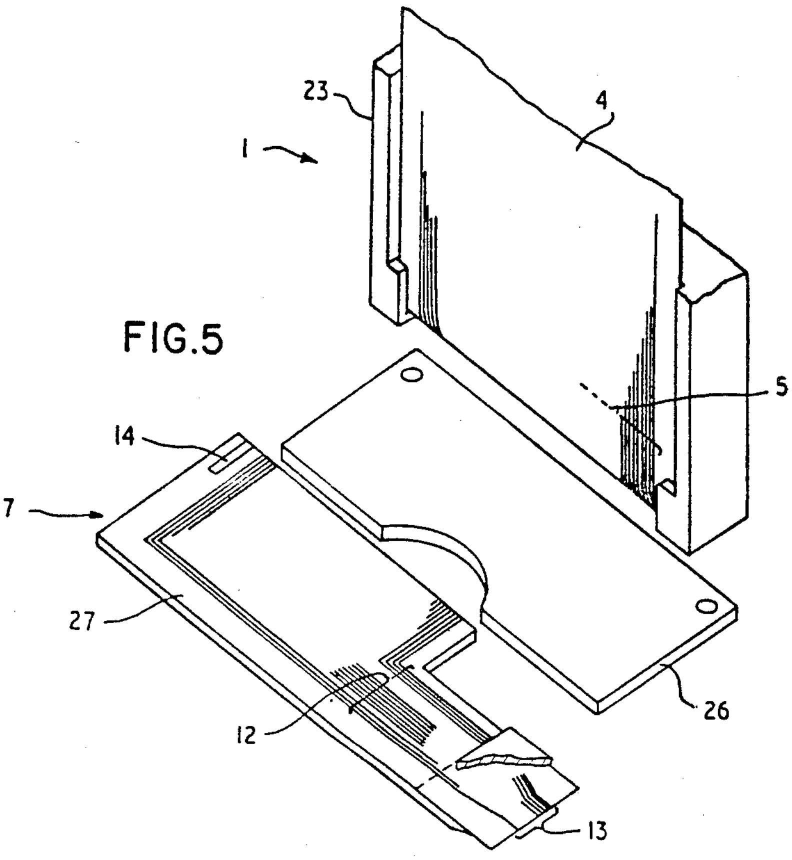
FIG. 5 shows an exploded view of a further embodiment of a print head assembly according to the invention.
Figure 7:
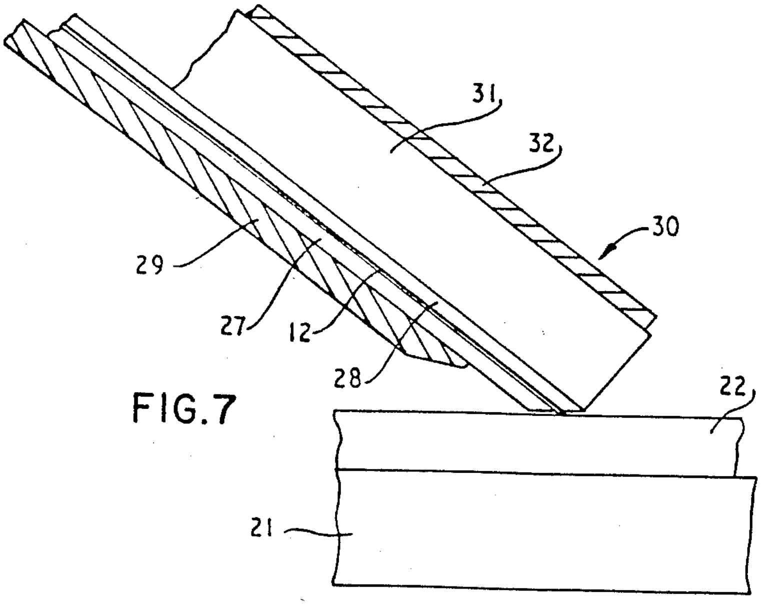
FIG. 7 shows in sectional view, a detail of the print head shown in FIG. 5.

A second embodiment of the invention shown in FIGS. 5, 6 and 7 is of a modified and more practical construction in which the print head clamp is dispensed with and heads are installed as simple interchangeable pluggable units in the body portion. Where possible, the same reference numerals are used for components in this embodiment as are used for corresponding components in the previous embodiment.

The body portion 1 consists of a channelled cable support 23 into which the tape cable 4 is slotted. From the sectional view of FIG. 2 it is seen that the end of the tape cable is turned under through 90° and cushioned on the underside of the support 23 by an intervening strip 24 of resilient material such as foam rubber. The protective insulating layer 25 is removed from the end of the tape cable leaving the conductors bare for subsequent connection to head electrodes. A head support plate 26 is screwed to the ends of projecting side members of the cable support 23 and defines between itself and the end of the tape cable, a recess into which a print head may be plugged.

Each print head 7 consists of a flexible insulative layer 27, carrying the print head electrodes 12 defining a print element 13, and the head type electrodes 14 (shown in simplest form for convenience) for identifying the head as described herein before. The printed circuit electrodes 12 in this embodiment are etched from stainless steel and the flexible supporting sheet is of polyimide. A further layer 28 of polyimide over the conductors protects them from damage and accidental short circuits. The printed circuit is supported, except in the vicinity of the print elements, on an aluminum L-shaped plate 29. A head pressure plate 30, (corresponding to substrate 9 in FIG. 1), comprising a rubber layer 31 and metal backing layer 32 is provided on the other side of the printed circuit member and support the printed circuit in the vicinity of the print elements. In use, this plate resiliently applies pressure to the print elements 13 to hold them firmly in contact with the resistive ribbon 22 and medium 21 as shown in FIG. 7. Prior to use the print elements of a print head are wiped across an abrasive surface to remove the insulating polyimide layer and expose the ends of the electrodes forming the print elements.

The whole structure of the print head is generally L-shaped shaped with the individual electrodes 12 turning through 90° to lie evenly distributed at a much wider pitch than print element 13 along one edge of the L-shaped support. The protective polyimide layer is removed from the electrodes where they terminate so that on insertion into the recess, ohmic contact is made with the correspondingly positioned conductors 5 on the tape cable 4. The lateral position of the print head is controlled by the extending side members of the cable support 23 and the depth is such that the head is a firm press-fit with the resilient contact pressure strip ensuring wiping contact between the electrodes and conductors during insertion thus ensuring good ohmic contact.

The width of the head element 13 in this embodiment is such that three rows of standard characters can be printed simultaneously. In the case of the standard head therefore 98 elements are provided as a print element 12.7 (half an inch) long.

I claim:

1. A print head assembly for non-impact printing comprising a body portion supporting a printed circuit print head formed as a plurality of electrodes on an insulating substrate, the electrodes extending across a portion of the substrate and having a first plurality of said electrodes terminating at one end thereof as a closely-spaced group of electrodes defining a line of print elements of predetermined size and print density, the body portion carrying a corresponding first plurality of conductors each disposed for unique one-to-one connection to said first plurality of electrodes, characterized in that the body portion is constructed to receive interchangeably any one of a plurality of such printed circuit print heads and includes registration means operable during installation of a head to control its position with respect to said body portion in an attempt to bring said electrodes on the head into the required registration with the conductors on the body portion and means operable to exert a clamping force on an installed print head to establish and maintain ohmic contact between any such electrodes and conductors in registration, said print head having an additional printed circuit electrode arranged, when the head is installed on said body portion, to contact a further conductor on the body portion, said further conductor being provided with two printed circuit guard conductors, on on each side of said further conductor and equal distant therefrom, the width of the additional electrode or the head and the spacing of the guard conductors, from the further conductor being such that lateral displacement of the installed head in either direction by more than a predetermined acceptable amount results in bridging, by said further electrode, of the gap between the further conductor and one of other of the guard conductors.

2. A print head assembly as claimed in claim 1, in which each print head is provided with an additional pattern of interconnected printed circuit electrodes which, by their relative disposition to each other and to additional conductors on said body portion, serve to identify which type of print head from a variety of available types of print head is currently installed on said body portion.

3. A print head assembly as claimed in claim 2, in which said additional printed circuit electrode is also one electrode forming said additional pattern of electrodes.

4. A print head assembly as claimed in claim 1, in which each said print head comprises a flexible printed circuit member carrying the print head electrodes, a rigid backing member supporting the flexible printed circuit member except over a predetermined portion of said member including, and in the vicinity of, the line of print elements, and a resilient backing member attached to said rigid backing member supporting the remainder of said flexible printed circuit member and operable, in use, to provide said head elements with resilient compliance during relative movement between said head and a print receiving medium.

5. A print head assembly as claimed in claim 2, in which each said print head comprises a flexible printed circuit member carrying the print head electrodes, a rigid backing member supporting the flexible printed circuit member except over a predetermined portion of said member including, and in the vicinity of, the line of print elements, and a resilient backing member attached to said rigid backing member supporting the remainder of said flexible printed circuit member and operable, in use, to provide said head elements with resilient compliance during relative movement between said head and a print receiving medium.

6. A print head assembly for non-impact printing comprising a body portion supporting a printed circuit print head formed as a plurality of electrodes on an insulating substrate, the electrodes extending across a portion of the substrate and having a first plurality of said electrodes terminating at one end thereof as a closely-spaced group of electrodes defining a line of print elements of predetermined size and print density, the body portion carrying a corresponding first plurality of conductors each disposed for unique one-to-one connection to said first plurality of electrodes, characterized in that the body portion is constructed to receive interchangeably any one of a plurality of such printed circuit print heads and includes registration means operable during installation of a head to control its position with respect to said body portion in an attempt to bring said electrodes on the head into the required registration with the conductors on the body portion and means operable to exert a clamping force on an installed print head to establish and maintain ohmic contact between any such electrodes and conductors in registration, said print head having an additional pattern of interconnected printed circuit electrodes which, by their relative disposition to each other and to additional conductors on said body portion, serve to identify which type of print head from a variety of available types of print head is currently installed of said body portion.

7. A print head assembly as claimed in claim 6, in which each said print head comprises a flexible printed circuit member carrying the print head electrodes, a rigid backing member supporting the flexible printed circuit member except over a predetermined portion of said member including, and in the vicinity of, the line of print elements, and a resilient backing member attached to said rigid backing member supporting the remainder of said flexible printed circuit member and operable, in use, to provide said head elements with resilient compliance during relative movement between said head and a print receiving medium.

* * * * *

UNITED STATES PATENT AND TRADEMARK OFFICE

CERTIFICATE OF CORRECTION

PATENT NO. : 4,554,559

DATED : November 19, 1985

INVENTOR(S) : John S. Heath

It is certified that error appears in the above-identified patent and that said Letters Patent are hereby corrected as shown below:

Col. 2, line 68, the word "full" should read --fully--;

Col. 4, line 3, the word "heat" should read --head--;

Col. 6, line 10, change the first occurrence of the word "on" to --one--;

Col. 6, line 12, the word "or" should read --on--;

Col. 6, line 18, change the first occurrence of the word "of" to --or--.

Signed and Sealed this

Tenth Day of March, 1987

*Attest:*

DONALD J. QUIGG

*Attesting Officer*

*Commissioner of Patents and Trademarks*